United States Patent [19]
Snaders

[11] 3,783,447
[45] Jan. 1, 1974

[54] THREE DIMENSIONAL RADAR TRANSPONDER SYSTEM

[75] Inventor: Robert W. Sanders, San Diego, Calif.

[73] Assignee: The United States of America as represented by the Secretary of the Navy, Washington, D.C.

[22] Filed: Sept. 21, 1972

[21] Appl. No.: 291,120

[52] U.S. Cl. ............................................. 343/17.7
[51] Int. Cl. ................................................ G01s 7/40
[58] Field of Search .................................. 343/17.7

[56] References Cited
UNITED STATES PATENTS

| | | | |
|---|---|---|---|
| 2,942,257 | 6/1960 | Huntington | 343/17.7 |
| 3,308,461 | 3/1967 | Von Fange | 343/17.7 |
| 3,263,228 | 7/1966 | Abrahams et al. | 343/17.7 |
| 3,295,130 | 12/1966 | Prestwood | 343/17.7 |

Primary Examiner—Malcolm F. Hubler
Attorney—R. S. Sciascia et al.

[57] ABSTRACT

An independent system to evaluate three dimensional radars which derive their height information from slant range and beam elevation. This transponder system consists of two major units, one of which senses the ship attitude and transmits this information to the control station. The second major unit on shore receives this information and uses it to update and preset conditions of the transponder, in accordance with the ship attitude, to synthesize a target at a given range, elevation and azimuth when the radar uses a specific beam to determine the angle of elevation of the target above the horizon.

6 Claims, 5 Drawing Figures ial radars.

THREE DIMENSIONAL RADAR TRANSPONDER SYSTEM

BACKGROUND OF THE INVENTION

This invention relates in general to the accuracy check of radars and more particularly to the accuracy check of three dimensional radars that derive their height information from slant range and beam elevation.

Two known means are currently used to check the accuracy of three dimensional radars one is by tracking a plane which is radar equipped, capable of tracking the ship and carries a precision altimeter. Slant range and height information is exchanged between the plane and ship for comparison. Azimuth information can be compared between the air search radar ship aboard the ship, however, in most cases there will be some paralex introduced. The second known means is tracking targets of opportunity in coordination with another ship in the same relative area. Correlation of the ship's relative position with respect to the target can be utilized. In each of the known means used, errors will be introduced by either system of the individual ship or plane that the other is not aware. Sufficient planes equipped and properly calibrated for these types of missions would be relatively expensive both in equipment and man hours. Most three dimensional radars have built-in self-checks, but they are not independent of the systems.

SUMMARY OF THE INVENTION

The present invention provides a means for evaluating three dimensional radars which derive their height information from slant range and beam elevation. A radar target is synthesized at a predetermined range and elevation. Range is derived from a pre-set counter which utilizes an accurately known time delay. The count is started by the received radar pulse from the ship's radar and the delayed transponders reply is generated at the end of the pre-set count. Height is simulated by transmitting the delay pulse on a predetermined frequency that corresponds to that utilized by the ship's radar to generate the main lobe of the antenna pattern, the position of which, with respect to the normal is frequency dependent. The shipboard portion of the system is utilized to sense both the ship's attitude and antenna position, solve the trigimetric relationship and transmit this information by data link to the control system on shore. The control station utilizes the received information to update the pre-set frequency of the transponder to present a stable target even though the ship may pitch or roll.

Accordingly, an object of the invention is to provide a system for checking the accuracy of three dimensional radars.

Another object of the invention is to synthesize a radar target by radiating a signal using the proper frequency and precisely timed from a known point with respect to the radar.

Other objects and many of the attendant advantages of this invention will be readily appreciated as the same becomes better understood by reference to the following detailed description when considered in connection with the accompanying drawings.

BRIEF DESCIRPTION OF THE DRAWINGS

DESCRIPTION OF THE PREFERRED EMBODIMENTS

The system embodying the invention consists of two major subassemblies. The mobile station carrying the radar which is to be given the accuracy check and a fixed station having a transponder which in response to a signal received from the mobile station will provide a three dimensional radar signal for transmission to the mobile station. Since it is necessary to establish the exact coordinates of the mobile station with respect to the control station other tracking stations may be utilized such as tracking stations 14 and 16.

Figure 3:
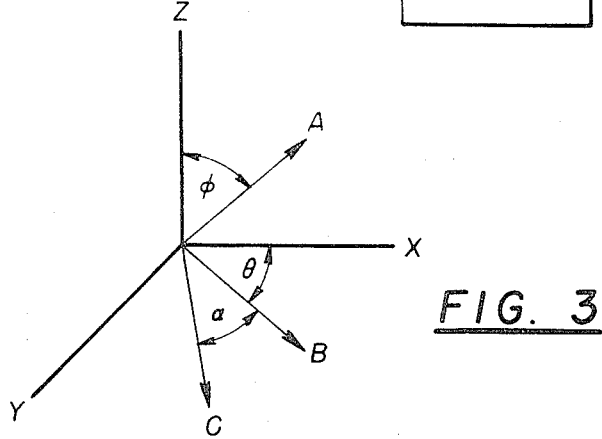
FIG. 3 is a graphical representation of the various components used in solving the problem to derive the appropriate values.

The major sub-assembly aboard the ship 10 consists of the ship's attitude converter 18, data converter 20 and data transmitter 22. Attitude converter 18 converts the ship's attitude in pitch roll and ship's antenna position to digital form. A voltage representing the product of the cosine of the angle generated by the vector voltage representing position of the ship's antenna with respect to the ship and the vector voltage representing the ship's attitude are combined and appear in digital form in data converter 20 and this signal is transmitted to the station 12 via data link 24. For example, the ship's attitude can be represented in three dimension as shown in FIG. 3 with the Z axis normal to the horizon, the X and Y axis representing magnitude of pitch and roll with the X axis also representing the ship's heading. Vector A represents the ship's relative displacement from the normal to the horizon and is shown by the angle. The vector B is the resultant vector of the pitch and roll; the angle $\theta$ is the angle with respect to the ship's heading. Vector C is the vector representing the ship's antenna position as it rotates with respect to the ship's own heading. Angle $\alpha$ is the angle generated as the ship's antenna rotates with respect to the ship's attitude vector. As the angle $\alpha$ develops the magnitude of vector B will vary with the ship's attitude; therefore if by multiplying the magnitude of vector B by the cosine of angle $\alpha$ a voltage can be developed which is directly related to the ship's attitude at any given instant with respect to the antenna's position. This information is transmitted to the station 10 via data link 24. It is necessary to know the magnitude and direction of the ship's displacement with respect to the horizon and the instant the ship's three dimensional radar is looking at the transponder. Utilizing the tracking stations 14 and 16 the ship's true heading and position with respect to the transponder is known at the instant of the mark signal. This information is then used to correlate with the transponder's frequency and time delay to establish the position of the synthesized target.

Figure 1:
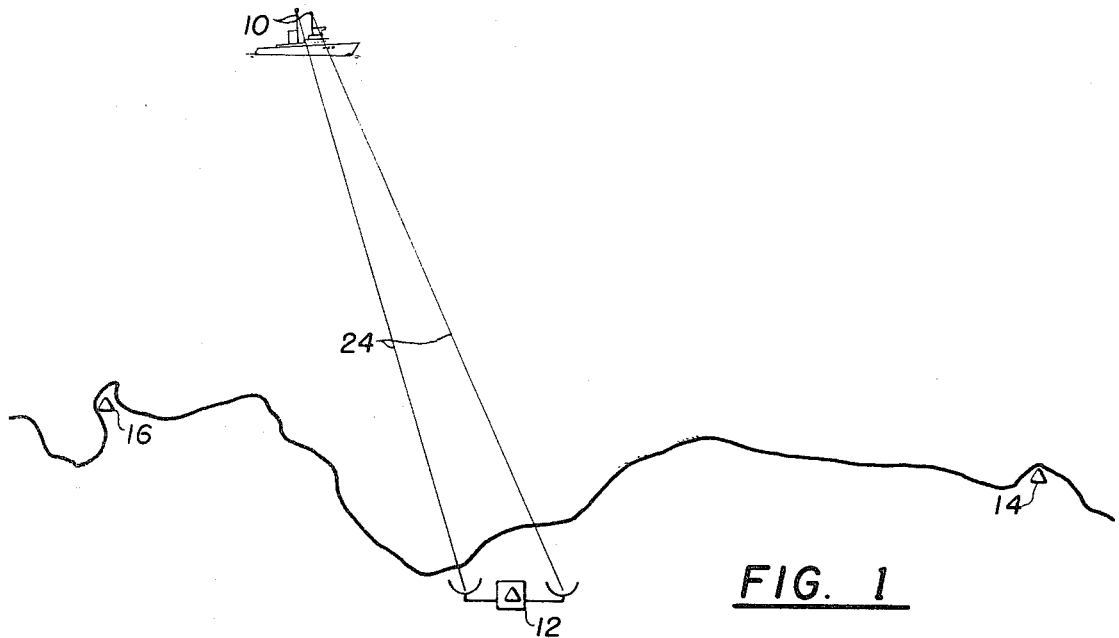
FIG. 1 is a typical layout of the NA testing situation.
Figure 2:
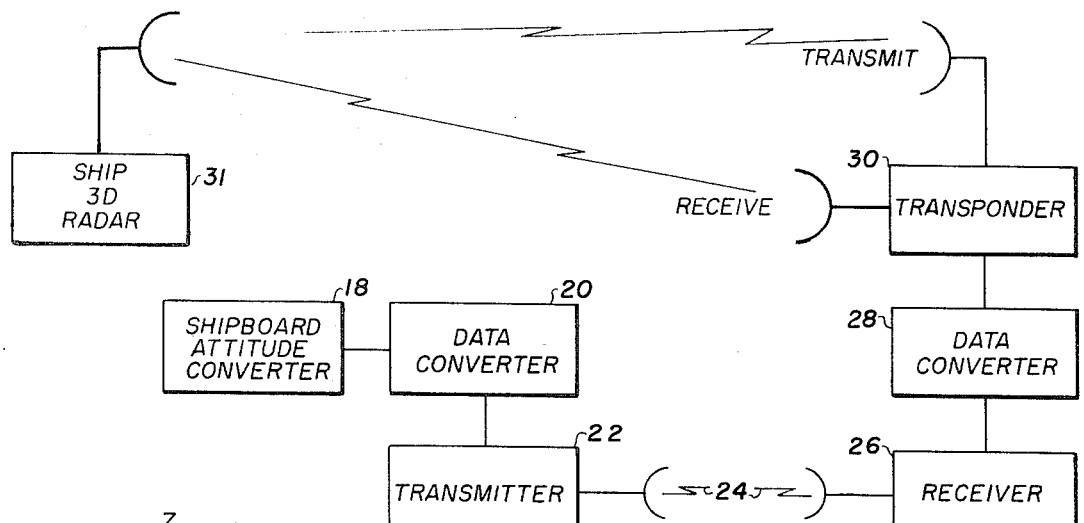
FIG. 2 is a block diagram of a preferred embodiment of the invention.
Figure 4:
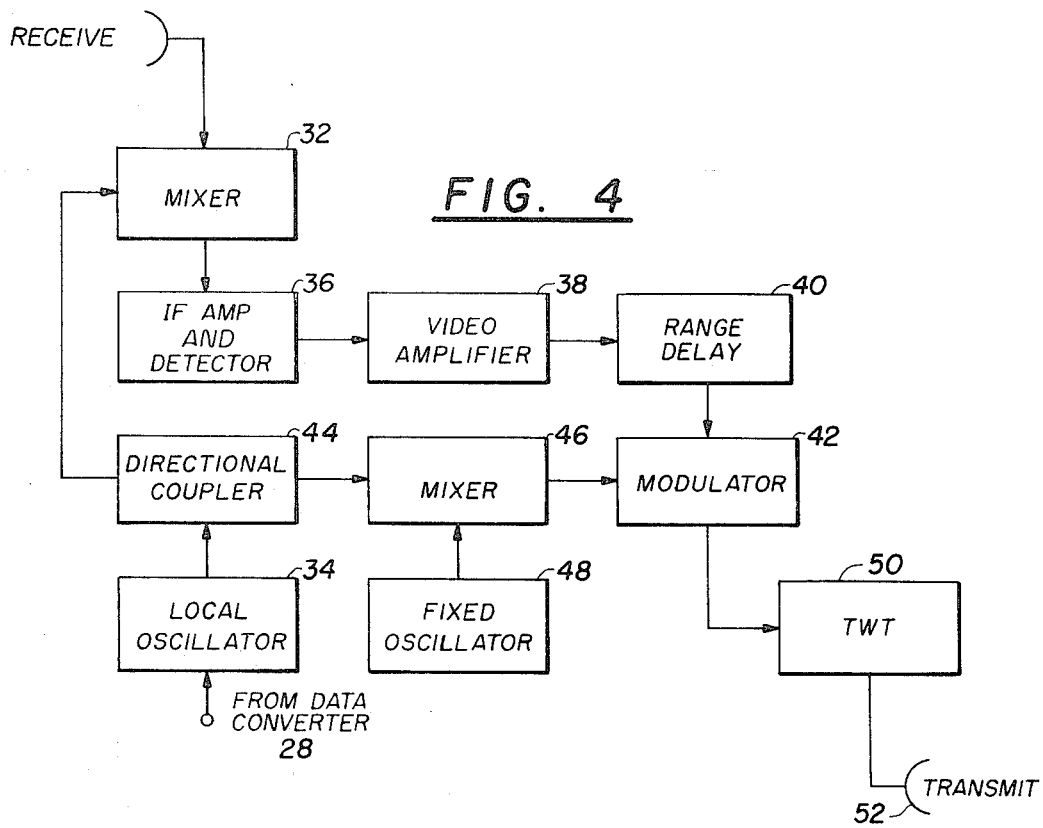
FIG. 4 is a block diagram of the transponder used in the embodiment of FIG. 2.

The second major sub-assembly is a receiver 26, data converter 28, and transponder 30 located at the fixed station 12 which when evaluating a three dimensional radar position on a ship is positioned on the shoreline with the ship being positioned within radar range off the coast. When the ship's attitude information is received at receiver 26 it is converted by data converter 28 and fed to transponder 30. The signal received at transponder 30 from data converter 28 is used to modify the preset frequency. Transponder 30 is preset to receive test signals from three dimensional radar 31 and reply on a specific frequency corresponding to a given angle of elevation. Referring now to FIG. 4 which shows the transponder 30 in more detail, the incoming signal from the three dimensional radar is fed to the first mixer 32 where it is combined with the signal from the pre-tuned oscillator 34 which may be pre-tuned for a particular test. The resultant output signal is the pulse signal at the IF frequency which is fed to IF amplifier and detector 36. The detected signal is further amplified in video amplifier 38 to an amplitude sufficient to trigger range delay unit 40 which should be of the type that can be preset to any range within the range capability of the radar 31 (FIG. 2). Range delay 40 should be preset to a particular range for a given test. The output signal from range delay unit 40 is used to key modulator 42. Pre-tuned local oscillator 34 is coupled through directional coupler 44 to first mixer 32 and to second mixer 46. In the second mixer 46 the local oscillator signal from local oscillator 34 is combined with the RF signal from fixed oscillator 48 which is tuned to the same frequency as the IF frequency. The output signal from the second mixer 46 is then the same frequency as the incoming signal from the three dimensional radar 35 but in CW form. When modulator 42 is keyed by the output of range delay unit 40, a pulse is generated which is then amplified by TWT 50 and fed to antenna 52 and radiated back to the three dimensional radar 35.

Figure 5:
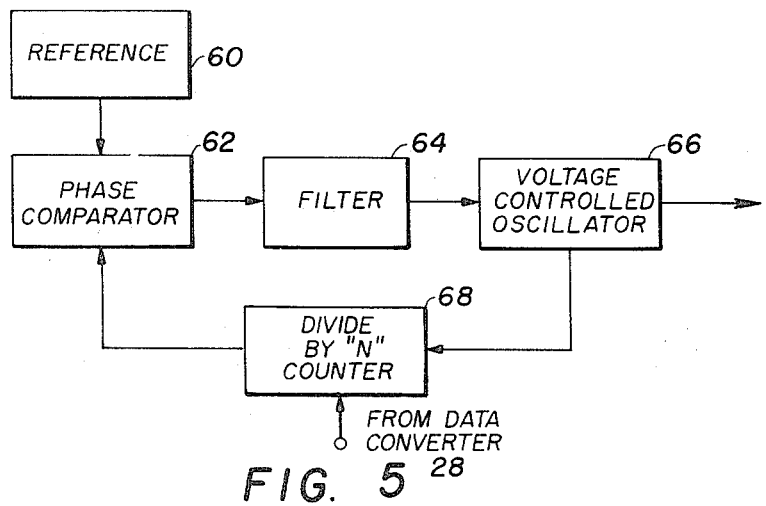
FIG. 5 is a block diagram of the frequency synthesizer used in the embodiment of FIG. 2.

Pre-tuned local oscillator 34 is essentially a frequency synthesizer (FIG. 5) which consist of a very stable reference 60 such as a low frequency crystal oscillator, a phase comparator 62, necessary filters 64, a voltage control oscillator 66 and a feedback loop 68 which consist of a presetable counter. The value of N in the feedback loop 68 will be dependent upon the value of the reference frequency 60 and the voltage control oscillator frequencies as well as frequency increments necessary for generating the elevation scan loops, structure of the three dimensional radar. In addition to being preset by a given frequency it must also have the capability of being updated as the ship's attitude changes.

Obviously many modifications and variations of the present invention are possible in the light of the above teachings. It is therefore to be understood that within the scope of the appended claims the invention may be practiced otherwise than as specifically described.

What is claimed is:

1. In a three dimensional radar test system for testing three dimensional radars mounted on board a ship or other moving platforms the combination comprising:
   a. a three dimensional radar for transmitting test signals;
   b. transmitter means located on the ship on which the three dimensional radar is located for transmitting signals representing the ship's attitude and the position of the radar antenna with respect to the ship;
   c. transponder means located on shore and having first antenna receiving means for receiving signals from said three dimensional radar and a second antenna receiving means for receiving the signals transmitted by said transmitter means and transmitting a signal for reception by said three dimensional radar modified in accordance with the received signals from said transmitting means to simulate a target for the radar being tested.

2. The test system of claim 1 wherein said transmitter means includes converter means for converting the ship's pitch, roll, and antenna position to digital form for transmission.

3. The system of claim 1 wherein said transponder comprises:
   a. a first mixer having a first input for receiving signals transmitted from said three dimensional radar, a second input and an output;
   b. a local oscillator being controlled by the signals received from said transmitting means, and having its output coupled to the second input of said first mixer;
   c. IF amplifier and detector circuit means coupled to the output of said first mixer;
   d. range delay circuit means coupled to and being responsive to the detected signal out of said IF amplifier and detector circuit means for producing an output delayed signal;
   e. a fixed frequency oscillator;
   f. a second mixer having a first input coupled to the output of said local oscillator and a second input coupled to the output of said fixed frequency oscillator and providing an output CW signal having the same frequency as the frequency of the signal received at the first input of said first mixer;
   g. a modulator circuit means having a first input coupled to the output of said second mixer and a second input coupled to the output of said range delay and being keyed by said range delay output signal;
   h. a transmitter coupled to said modulator for transmitting a signal back to said three dimensional radar.

4. The system of claim 3 wherein said local oscillator is a frequency synthesizer.

5. The system of claim 4 wherein said frequency synthesizer comprises:
   a. a voltage controlled oscillator;
   b. a reference oscillator;
   c. a phase comparator having a first input coupled to said reference oscillator, a second input and an output coupled to said voltage controlled oscillator;
   d. a feedback loop coupled from the output of said voltage controlled oscillator to the second input of said phase comparator for providing a control voltage to said voltage controlled oscillator when there is a phase difference between the two inputs of said phase comparator.

6. The system of claim 4 wherein said feedback loop is a preset counter controlled by the signals transmitted by said transmitting means.

* * * * *

UNITED STATES PATENT OFFICE
CERTIFICATE OF CORRECTION

Patent No. 3,783,447　　　　　　　　Dated December 11, 1973

Inventor(s) Robert W. Sanders

It is certified that error appears in the above-identified patent and that said Letters Patent are hereby corrected as shown below:

On the cover sheet, in the second line under the heading, change the spelling of the inventor's last name from "Snaders" to -- Sanders --.

Signed and sealed this 14th day of May 1974.

(SEAL)
Attest:

EDWARD M. FLETCHER, JR.　　　　　　C. MARSHALL DANN
Attesting Officer　　　　　　　　　　Commissioner of Patents